United States Patent
Rink et al.

[11] Patent Number: 5,836,610
[45] Date of Patent: Nov. 17, 1998

[54] MULTIPLE LEVEL FLUID FUELED AIRBAG INFLATOR

[75] Inventors: Karl K. Rink, Liberty; David J. Green, Brigham City; Walter A. Moore; Glen S. Beus, both of Ogden, all of Utah

[73] Assignee: Morton International, Inc., Chicago, Ill.

[21] Appl. No.: 886,778

[22] Filed: Jul. 1, 1997

Related U.S. Application Data

[63] Continuation of Ser. No. 437,911, May 10, 1995, abandoned, which is a continuation-in-part of Ser. No. 339,603, Nov. 15, 1994, Pat. No. 5,531,473, which is a continuation-in-part of Ser. No. 252,036, May 31, 1994, Pat. No. 5,470,104.

[51] Int. Cl.⁶ .................................................. B60R 21/26
[52] U.S. Cl. ........................................... 280/736; 280/737
[58] Field of Search ................................. 280/737, 735, 280/741, 736

[56] References Cited

U.S. PATENT DOCUMENTS

| | | | |
|---|---|---|---|
| 3,767,228 | 10/1973 | Lewis | 280/150 |
| 3,817,263 | 6/1974 | Bendler et al. | 137/68.1 |
| 3,822,895 | 7/1974 | Ochiai | 280/737 |
| 3,901,530 | 8/1975 | Radke | 280/741 |
| 3,966,224 | 6/1976 | Campbell et al. | 280/735 |
| 4,018,457 | 4/1977 | Marlow | 280/735 |
| 4,104,092 | 8/1978 | Mullay | 149/2 |
| 4,243,248 | 1/1981 | Scholz et al. | 280/735 |
| 4,246,051 | 1/1981 | Garner et al. | 149/7 |
| 4,341,651 | 7/1982 | Beckert et al. | 149/87 |
| 4,561,675 | 12/1985 | Adams et al. | 280/741 |
| 4,620,721 | 11/1986 | Scholz et al. | 280/735 |
| 4,984,651 | 1/1991 | Grosch et al. | 180/268 |
| 5,022,674 | 6/1991 | Frantom et al. | 280/741 |
| 5,060,973 | 10/1991 | Giovanetti | 280/736 |
| 5,071,160 | 12/1991 | White et al. | 280/735 |
| 5,074,583 | 12/1991 | Fujita et al. | 280/735 |
| 5,232,243 | 8/1993 | Blackburn et al. | 280/732 |
| 5,263,740 | 11/1993 | Frey et al. | 280/737 |
| 5,290,060 | 3/1994 | Smith | 280/737 |
| 5,301,979 | 4/1994 | Allard | 280/741 |
| 5,330,730 | 7/1994 | Brede et al. | 422/305 |
| 5,344,186 | 9/1994 | Bergerson | 280/741 |
| 5,346,249 | 9/1994 | Hallard et al. | 280/728 |
| 5,348,344 | 9/1994 | Blumenthal et al. | 280/737 |
| 5,350,192 | 9/1994 | Blumenthal | 280/737 |
| 5,351,988 | 10/1994 | Bishop et al. | 280/737 |
| 5,356,176 | 10/1994 | Wells | 280/737 |
| 5,364,127 | 11/1994 | Cuevas | 280/741 |
| 5,407,226 | 4/1995 | Lauritzen et al. | 280/728 |
| 5,411,289 | 5/1995 | Smith et al. | 280/735 |

FOREIGN PATENT DOCUMENTS

| | | |
|---|---|---|
| 0540013 | 5/1993 | European Pat. Off. . |
| 0604001 | 6/1994 | European Pat. Off. . |
| 2112006 | 8/1977 | Germany . |
| 4135547 | 4/1993 | Germany . |
| 4135776 | 5/1993 | Germany . |
| 2270742 | 3/1994 | United Kingdom . |
| 9115380 | 10/1991 | WIPO . |

*Primary Examiner*—Paul N. Dickson
*Attorney, Agent, or Firm*—Speckman Pauley Petersen & Fejer

[57] ABSTRACT

An improvement in an air bag system for a motor vehicle relating to a multiple level fluid fueled air bag inflator and method of operation thereof are provided. Such a multiple level inflator includes a stored gas chamber, a combustion chamber wherein, upon actuation, a fluid fuel and an oxidant are burned, an opener to open the stored gas chamber and an initiator device to initiate the burning of the fluid fuel and oxidant in the combustion chamber. Various performance levels can be obtained through the proper selected actuation and sequencing of actuation of the opener and the initiator device.

14 Claims, 4 Drawing Sheets

MULTIPLE LEVEL FLUID FUELED AIRBAG INFLATOR

CROSS REFERENCE TO RELATED APPLICATIONS

This application is a continuation of application, U.S. Ser. No. 08/437,911, filed on May 10, 1 995 now abandoned, which in turn is a continuation-in-part application of application, U.S. Ser. No. 08/339,603, filed on Nov. 15, 1994 now U.S. Pat. No. 5,531,473, which in turn a continuation-in-part application of application, U.S. Ser. No. 08/252,036, filed on May 31, 1994 now U.S. Pat. No. 5,470,104. These prior applications are hereby incorporated by reference herein and are made a part hereof, including but not limited to those portions which specifically appear hereinafter.

BACKGROUND OF THE INVENTION

This invention relates generally to an apparatus, commonly referred to as an inflator, for use in inflating an inflatable device such as an inflatable vehicle occupant restraint of a respective inflatable restraint system.

Various arrangements are known in the art for protecting an occupant of an automotive vehicle, in the event of a collision, with an inflatable restraint, e.g., an air bag. In addition, various inflatable restraint system arrangements have been proposed wherein the inflation of the air bag is adjusted based on factors such as, for example, the speed of deceleration of the vehicle and seat belt usage by the occupant.

For example, U.S. Pat. No. 5,323,243 discloses an occupant sensing apparatus for use in an occupant restraint system. The disclosed occupant sensing apparatus preferably monitors the passenger seat in the vehicle to detect the presence, position and weight of an object on the seat. A control algorithm is performed to control air bag inflation responsive to the detected values.

U.S. Pat. No. 5,074,583 discloses an air bag system for an automobile including a seating condition sensor that detects a seating condition of a passenger with respect to seat position, reclining angle, as well as passenger size and posture. The air bag is operated in accordance with the seating condition of the passenger such that the inflated bag is brought into optimal contact with the occupant.

In addition, many types of inflator devices have been disclosed in the art for inflating an air bag for use in an inflatable restraint system. One type of inflator device involves the utilization of a quantity of stored compressed gas which is selectively released to inflate the air bag. To properly inflate a typical air bag at an appropriate rate, such a type of device commonly requires the storage of a relatively large volume of gas at relatively high pressures. As a result of the high pressures, the walls of the gas storage chamber are typically relatively thick for increased strength. The combination large volume and thick walls results in relatively heavy and bulky inflator designs. In addition, a technique designed to initiate the release of the stored gas into the air bag must be devised.

Another type of inflator device derives a gas source from a combustible gas generating material which, upon ignition, generates a quantity of gas sufficient to inflate the air bag. Typically, such gas generating materials can produce various undesirable combustion products, including various solid particulate materials. The removal of such solid particulate material, such as by the incorporation of a filtering device within or about the inflator, undesirably increases inflator design and processing complexity and can increase the costs associated therewith.

In addition, the temperature of the gaseous emission of such inflator devices can typically vary between about 500°F. (260° C.) and 1200°F. (649° C.), dependent upon numerous interrelated factors including the desired level of inflator performance, as well as the type and amount of gas generant used therein, for example. Consequently, air bags used in conjunction with such inflator devices typically are constructed of or coated with a material resistant to such high temperatures. For example, an air bag such as constructed of nylon fabric, in order to resist burn through as a result of exposure to such high temperatures, can be prepared such that the nylon fabric air bag material is coated with neoprene or one or more neoprene coated nylon patches are placed at the locations of the air bag at which the hot gas initially impinges. As will be appreciated, such specially fabricated or prepared air bags typically are more costly to manufacture and produce.

Further, while vehicular inflatable restraint systems are preferably designed to be properly operational over a broad range of conditions, the performance of such inflator device designs can be particularly sensitive to changes in the ambient conditions, especially temperature. For example, operation at very low temperatures, such as temperatures of −40°F. (−40° C.), can affect the performance of various propellants, and thus lower air bag pressure resulting from an inflator which contains a fixed available amount of propellant.

In a third type of inflator device, air bag inflating gas results from a combination of stored compressed gas and combustion of a gas generating material. This type of inflator device is commonly referred to as an augmented gas or hybrid inflator. Hybrid inflators that have been proposed heretofore are subject to certain disadvantages. For example, inflator devices of such design typically result in a gas having a relatively high particulate content.

Various specific inflator devices and assemblies have been proposed in the prior art. U.S. Pat. No. 5,263,740 discloses an assembly wherein within a single chamber is housed both an inflation gas and a first ignitable material, which is subsequently ignited therein.

The housing of both an inflation gas and an ignitable material within a single chamber can result in production and storage difficulties. For example, concentration gradients of such components, both initially and over time as the device awaits actuation, can increase the potential for the release therefrom of ignitable material into the air bag prior to complete ignition, as well as increasing the relative amount of incomplete products of combustion released into the air bag.

Also, gas generators wherein, for example, a fuel and an oxidant are stored in a single chamber, can under certain extreme circumstances be subject to autoignition (i.e., self-ignition) and the consequent dangers that may be associated therewith, both during manufacture and storage.

Further, as the gas mixture resulting from such a single storage chamber assembly will typically be at a relatively high temperature, such designs can be subject to the same or similar shortcomings identified above associated with high temperature emissions.

In an effort to avoid or minimize at least some of these shortcomings, it has been proposed to store the fuel and oxidant in such single chamber gas generators as a fuel lean mixture. However, operation with fuel lean mixtures can itself be subject to various operational difficulties. For example, such a single chamber gas generator operated with a fuel lean mixture can experience ignition difficulties as it can be difficult to ensure that a fuel lean mixture is completely or sufficiently uniformly combustible so as to not unduly hinder performance. Also, in single chamber designs, particularly those designs operated fuel lean, the occurrence of an even slight fuel leak can result in immediate and likely significant degradation of performance for the inflator assembly performance.

In addition, as a result of the rapid pressure and temperature rises normally associated with inflator devices which house a mixture of oxidant and ignitable material, proper and desired control and operation of such inflator devices can be difficult and/or complicated.

Further, prior art pyrotechnic, hybrid and gaseous fueled inflators which, in order to ensure the proper occurrence of the desired combustion reaction, rely on attaining and maintaining an operating pressure within a specified range typically couple the rate or occurrence of the combustion reaction with the rate at which stored gas or generated gas are supplied to the air bag. Such coupling typically limits the range of response of those systems utilizing such prior art inflators.

Thus, there is a need and a demand for improvement in air bag inflators to the end of overcoming the foregoing disadvantages. More particularly, there is a need for the provision of air bag inflation gas at a relatively low temperature and having a relatively low concentration of undesirable combustion products, especially particulate matter. Further, there is a need for an inflator device of simple design and construction which device is effectively operable using a variety of fuels, oxidants, and stored gases. In addition, there is a need for an inflator design that reduces or eliminates the potential of autoignition of an inflation gas/ignitable material mixture. Still further, there is a need for the provision of air bag inflation gas containing no more than limited amounts of oxygen gas and moisture, thereby avoiding or minimizing the problems associated therewith. Yet still further, there is a need for an inflation device that minimizes or avoids the undesirable introduction of combustible mixtures into the air bag upon inflation. Still yet still further, there is a need for a multiple level air bag inflator which can vary inflation gas parameters such as quantity, supply, and rate of supply, dependent on selected operating conditions better than is currently possible with known inflation devices.

SUMMARY OF THE INVENTION

A general object of the invention is to provide an improved apparatus and method for inflating an inflatable device such as an inflatable restraint for occupants of motor vehicles.

Another general objective of the invention is to provide a multiple level air bag inflator which can vary inflation gas parameters such as quantity, supply, and rate of supply, dependent on selected operating conditions better than is currently possible with known inflation devices.

Still another general objective of the invention is to provide an improved method of operation for a multiple level air bag inflator device.

A more specific objective of the invention is to overcome one or more of the problems described above.

The general objects of the invention can be attained, at least in part, through a multiple level air bag inflator for an air bag system of a motor vehicle. In practice, such a system will desirably include at least one air bag module containing at least one inflatable air bag and sensor means for sensing at least one air bag operating condition selected from the group of ambient temperature, occupant presence, seat belt usage and deceleration of the motor vehicle.

The multiple level air bag inflator is coupled to the at least one air bag module for generating a multiple level gas applied to the air bag module. The multiple level air bag inflator includes first and second chambers. The first chamber contains a supply of pressurized stored gas and has at least one gas exit port with sealing means normally closing the at least one gas exit port. The second chamber wherein, upon actuation, at least one fluid fuel and at least one oxidant are burned to produce combustion products including hot combustion gas, includes at least one gas exit opening with sealing means normally closing the gas exit opening. The second chamber sealing means has a first surface adjacent the first chamber and a second surface adjacent the second chamber such that upon opening of the second chamber sealing means the second chamber is in fluid communication with the first chamber. The second chamber sealing means are adapted to open when the difference in pressure at the first and the second surfaces becomes sufficiently large, whereby at least a portion of the contents of the second chamber are passed into the first chamber.

The multiple level air bag inflator also includes: a) opening means to open the at least one gas exit port whereby at least a portion of the contents of the first chamber are expelled therefrom, b) directing means for directing the expelled contents of said first chamber to the inflatable device, and c) initiator means for initiating the burning of the at least one fluid fuel and the at least one oxidant in said second chamber.

In such a system, upon receipt by the module of a first level output from the sensor means, the expelled contents from the first chamber consist essentially of at least a portion of the stored gas.

Further, in one embodiment, upon receipt by the module of a second level output from the sensor means, the expelled contents from the first chamber initially consist essentially of at least a portion of the stored gas. At a predetermined interval subsequent to the initial release of contents from the first chamber, however, the expelled contents from the first chamber include at least a portion of the contents of the second chamber passed into the first chamber from the second chamber.

Upon receipt by the module of a third level output from the sensor means, the expelled contents from the first chamber include at least a portion the stored gas and at least a portion of the combustion products produced by burning the at least one fluid fuel and the at least one oxidant in the second chamber.

The prior art fails to provide an air bag system which, from a single source and dependent on appropriately selected operating conditions, can effectively and efficiently produce air bag inflation gas at a rate and/or pressure selected from a wide range of possible responses. Further, the prior art fails to provide a multiple level air bag inflator which effectively and efficiently decouples the rate of the gas generating combustion reaction from the rate of supply of stored or generated gas therefrom.

The invention further comprehends an improvement in an air bag system for a motor vehicle wherein the system includes at least one air bag module containing at least one inflatable air bag and sensor means for sensing at least one air bag operating condition selected from the group of ambient temperature, occupant presence, seat belt usage and deceleration of the motor vehicle. The improvement relates to a multiple level air bag inflator coupled to the air bag module for generating a multiple level gas applied to the module.

Specifically, the multiple level inflator includes first and second chambers. The first chamber contains a supply of pressurized stored gas and has at least one gas exit port with sealing means normally closing the at least one gas exit port. The second chamber, which contains a supply of at least one fluid fuel stored separately from at least one oxidant and wherein, upon actuation, the at least one fluid fuel and the at least one oxidant are contacted and burned to produce combustion products including hot combustion gas, includes at least one gas exit opening and has sealing means normally closing the gas exit opening. The second chamber sealing means have a first surface adjacent the first chamber and a second surface adjacent the second chamber such that upon opening of the second chamber sealing means the second chamber is in fluid communication with the first chamber. Further, the second chamber sealing means are adapted to open when the difference in pressure at the first and the second surfaces becomes sufficiently large, whereby at least a portion of the contents of the second chamber are passed into the first chamber.

The multiple level air bag inflator also includes: a) opening means to open the at least one gas exit port whereby at least a portion of the contents of the first chamber are expelled therefrom, b) directing means for directing the expelled contents of said first chamber to the inflatable device, and c) initiator means for initiating the burning of the at least one fluid fuel and the at least one oxidant in said second chamber.

In such a system, upon receipt by the module of a first level output from the sensor means, the expelled contents from the first chamber consist essentially of at least a portion of the stored gas.

Upon receipt by the module of a second level output from the sensor means, the expelled contents from the first chamber initially consist essentially of at least a portion of the stored gas and, at a predetermined interval subsequent to the initial expulsion of contents from the first chamber consisting essentially of at least a portion of the stored gas, the expelled contents from the first chamber include at least a portion of the contents of the second chamber passed thereinto from the second chamber.

Upon receipt by the module of a third level output from the sensor means, the expelled contents from the first chamber include at least a portion the stored gas and at least a portion of the combustion products produced by burning the at least one fluid fuel and the at least one oxidant in the second chamber.

The invention still further comprehends methods of operation of such multiple level air bag inflators. In accordance with one such method, in response to receipt by an air bag module coupled to the multiple level air bag inflator of a first level output from a sensor means, the method includes the steps of: a) opening the at least one gas exit port of the first chamber, and b) expelling contents from the first chamber consisting essentially of at least a portion of the stored gas therefrom.

In one embodiment, where the multiple level air bag inflator additionally includes, in the static state and within the second chamber, a fluid fuel holder in which the at least one fluid fuel is stored separately from the at least one oxidant, in response to receipt by the module of a second level output from the sensor means the method includes the steps of: a) opening the at least one gas exit port, b) expelling contents from the first chamber consisting essentially of at least a portion the stored gas, c) opening the second chamber sealing means whereby at least a portion of the contents of the second chamber are passed into the first chamber, and d) subsequently, expelling contents from the first chamber comprising at least a portion of the contents of the second chamber passed into the first chamber from the second chamber.

In response to receipt by the module of a third level output from the sensor means, the method includes the steps of: a) initiating and burning the at least one fluid fuel and the at least one oxidant in the second chamber, b) opening the at least one gas exit port and the second chamber sealing means, and c) expelling contents from the first chamber comprising at least a portion the stored gas and at least a portion of the combustion products produced by burning the at least one fluid fuel and the at least one oxidant in the second chamber.

The term "equivalence ratio" ($\phi$) is commonly used in reference to combustion processes. Equivalence ratio is defined as the ratio of the actual fuel to oxidant ratio $(F/O)_A$ divided by the stoichiometric fuel to oxidant ratio $(F/O)_s$:

$$\phi = (F/O)_A/(F/O)_s$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.) In general, for given temperature and pressure conditions, fuel and oxidant mixtures are flammable over only a specific range of equivalence ratios.

As used herein, references to detection or sensing of "occupant presence" are to be understood to refer to and include detection and sensing of size, weight, and/or positions of the particular occupant under consideration.

Other objects and advantages will be apparent to those skilled in the art from the following detailed description taken in conjunction with the appended claims and drawings.

DETAILED DESCRIPTION OF THE INVENTION

Figure 1:
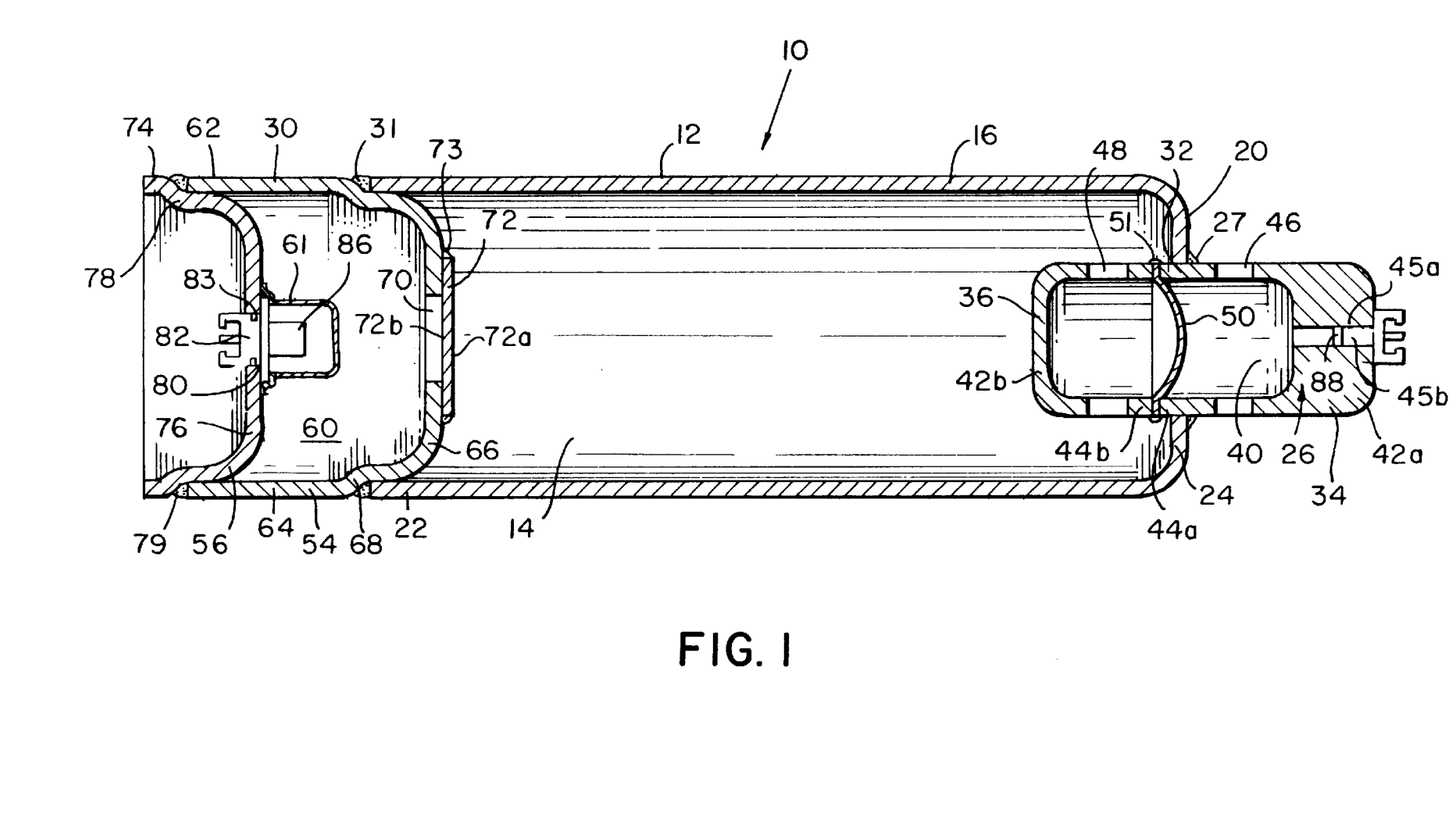
FIG. 1 is a simplified, partially in section, schematic drawing of a multiple level fluid fueled air bag inflator in accordance with one embodiment of the invention.

Referring initially to FIG. 1, there is illustrated a multiple level fluid fueled passenger side air bag inflator 10, in accordance with one embodiment of the invention. It will be understood that the invention described hereinafter has general applicability to various types or kinds of air bag assemblies including driver side, passenger side, and side impact air bag assemblies for automotive vehicles including vans, pick-up trucks, and particularly automobiles.

The inflator assembly 10 comprises a pressure vessel 12 including a chamber 14 that is filled and pressurized with an inert gas such as argon or nitrogen to a pressure typically in the range of 2000–4000 psi. Thus, the chamber 14 is sometimes referred to herein as a "gas storage chamber".

The chamber 14 is defined by an elongated generally cylindrical sleeve 16, having a first and a second end, 20 and 22, respectively. The first end 20 is partially closed by means of an integral shoulder portion 24. A diffuser assembly 26 is attached by a circumferential weld 27 in sealing relation to the sleeve first end 20. A combustion chamber assembly 30 is attached by a circumferential weld 31 in sealing relation to the sleeve second end 22.

The diffuser assembly 26 comprises a generally cylindrical sleeve 32 having a cap portion 34 and a base portion 36 to define a diffusion chamber 40. Each of the diffuser assembly cap and base portions, 34 and 36, respectively, include a first end 42a and 42b, respectively, and an open second end 44a and 44b, respectively. The first end 42a of the cap portion 34 includes an opening 45a therein, wherethrough a gas storage chamber opening device 45b, such as described in greater detail below, is attached by a suitable means of attachment such as by crimping or the use of a weld.

In addition, the diffuser assembly cap portion 34 includes a plurality of openings 46, adjacent the closed cap first end 42a, for dispensing and directing inflation gas from the inflator assembly into an air bag assembly (not shown). The diffuser assembly base portion 36 additionally includes a plurality of openings 48, adjacent the closed base first end 42b, for passage of contents from the storage chamber 14, into the diffuser chamber 40.

The diffuser assembly cap and base portions, 34 and 36, respectively, are aligned with the open second end of each, i.e., ends 44a and 44b, respectively, being closed by sealing means, e.g., by means of a rupture disc 50 abutting thereagainst. The diffuser assembly rupture disc 50 is joined in sealing relation with the diffuser assembly cap and base portions, 34 and 36, respectively, by means of a circumferential weld 51 at the periphery of the disc 50. In the static state, the disc 50 serves to separate the contents of the storage chamber 14 from the air bag.

The combustion chamber assembly 30 comprises a cap portion 54 and a base portion 56 to define a combustion chamber 60. Within the combustion chamber 60 are stored one or more fluid fuels and one or more oxidants. More specifically, the one or more fluid fuels are, in the static state, stored or held within a fluid fuel holder 61 within the combustion chamber 60 with the one or more oxidants stored within the combustion chamber 60 outside of the fluid fuel holder 61. As will be detailed below, however, upon proper actuation of the inflator assembly 10, the one or more fluid fuels and the one or more oxidants are contacted, forming a flammable mixture.

The combustion chamber cap portion 54 includes a sleeve 62, constituting a side wall 64 with a dome 66 joined thereto via a cap shoulder connecting portion 68. The combustion chamber dome 66 includes an orifice, referred to herein as a gas exit opening 70. The gas exit opening 70 is normally closed by sealing means, e.g, by means of a rupture disc 72 joined in sealing relation with the combustion chamber dome 66 by means of a circumferential weld 73 at the periphery of the disc 72. The disc 72 includes first and second surfaces 72a and 72b adjacent the storage chamber 14 and the combustion chamber 60, respectively.

The combustion chamber dome 66 is generally designed to withstand the internal pressures generated upon the combustion of the flammable mixture within the combustion chamber 60. In the static state, the disc serves in maintaining the gas storage chamber 14 in a sealed condition. However, such as further described below, when the difference in pressure at or along the first surface 72a and at or along the second surface 72b becomes sufficiently large, the disc 72 is adapted to rupture or otherwise permit passage of at least a portion of the contents of the combustion chamber 60 into the storage chamber 14.

The combustion chamber base portion 56 includes a base ring 74 with a base cap 76 joined thereto via a base shoulder connecting portion 78. The base shoulder connecting portion 78 serves as a convenient means of locating the combustion chamber base portion 56 relative to the combustion chamber sleeve 62, as well as providing a location for a circumferential weld 79 whereby the combustion chamber assembly base portion 56 is attached in sealing relation to the combustion chamber cap portion 54.

The base cap 76 includes an opening 80 therein, wherethrough an initiator device 82 is attached in sealing relation within the combustion chamber 60 as with an O-ring 83, crimping or other suitable hermetic seal. In such an assembly, the initiator device will preferably of a pyrotechnic type as pyrotechnic initiator devices can: 1) advantageously provide sufficient energy output to open or rupture the separation means separating the fuel from the oxidant, 2) adequately disperse and vaporize the fuel in the combustion chamber, and 3) provide sufficient residual heat to ignite the resulting fuel and oxidant mixture.

As identified above, the one or more fluid fuels are, in the static state, stored or held within the fluid fuel holder 61 within the combustion chamber 60 with the one or more oxidants stored within the combustion chamber 60 outside of the fluid fuel holder 61. Specifically, the fluid fuel holder 61 is preferably arranged adjacent and proximate to the discharge end 86 of the initiator device 82 such that upon actuation of an initiator device 82, such as containing a charge of igniter material, sufficient combustion products are produced and directed at the fluid fuel holder 61 to result in opening or rupturing of the holder 61 with the one or more fluid fuels previously held therein being released into the combustion chamber 60 to contact and mix with the surrounding one or more oxidants stored in the chamber 60.

Commonly assigned and herein incorporated parent patent application Ser. No. 08/339,603, filed on Nov. 15, 1994, discloses a fluid fuel-containing initiator device that can advantageously be used in the inflator 10.

It is to understood that the gas storage chamber opening device 45b, similar to the initiator device 82, can also be of a pyrotechnic type. In the illustrated embodiment, however, the gas storage chamber opening device 45b includes therewith a projectile 88. Thus, upon actuation of the opening device 45b, the projectile is projected at the rupture or otherwise open the disc 50 to affect release of the gas from the stored gas chamber 14.

OPERATION

As will be described in greater detail in connection with the examples contained herein and such as through the proper timing and sequencing of the actuation or firing of the gas storage chamber opening device 45b and the combustion chamber initiator device 82, a wide range of response can be obtained from an air bag system using the multiple level fluid fuel-containing air bag inflator described herein.

A. MODE 1

As will be detailed below, under certain circumstances the inflator 10 is operated such that only the gas storage chamber opening device 45b, and not the initiator 82, is actuated or fired, with the so operated inflator solely releasing the relatively cold, inert gas stored in the gas storage chamber 14.

B. MODE 2

Under different circumstances, such as, for example, a high speed collision in which the occupant is seated in the proper position to be properly cushioned by the air bag, it can be advantageous for the inflator 10 to be operated such that only the initiator 82, and not the gas storage chamber opening device 45b, is actuated or fired. With such operation, no stored inert gas is released early (e.g., prior to combustion of the at least one fluid fuel and the at least one oxidant within the combustion chamber 60). Consequently, such operation would typically result in a relatively steep inflation gas pressure rise rate for the inflator, in turn increasing the rapidity with which the corresponding air bag becomes fully inflated.

In such operation, actuation of the initiator device 82 results in the discharge therefrom of sufficient combustion products to result in the opening or rupturing of the fluid fuel holder 61. As a result, the one or more fluid fuels previously held therein are released into the combustion chamber 60 to contact and mix with the surrounding one or more oxidants stored in the chamber 60, with the discharged combustion products further resulting in initiation of the combustion of the resulting flammable mixture within the combustion chamber 60. The hot gas produced upon the burning of the flammable mixture results in a rapid pressure rise within the combustion chamber 60. When the gas pressure within the combustion chamber 60 exceeds the structural capability of the rupture disc 72, the disc ruptures or otherwise permits the passage of the hot gas through the gas exit opening 70 and into the storage chamber 14. Wherein, the hot combustion gas expelled from the combustion chamber 60 mixes with the pressurized gas stored within the separate storage chamber 14 to produce inflation gas for use in inflating the inflatable restraint device, e.g., an air bag. It will be appreciated that augmenting the combustion gas with the stored inert gas produces an inflation gas having both a lower temperature and reduced byproduct concentration (e.g., CO, $NO_x$, $H_2O$, etc.) than the combustion gas alone.

When the gas pressure within the storage chamber 14 exceeds the structural capability of the rupture disc 50, the disc ruptures or otherwise permits the passage of the inflation gas through the diffuser base portion 36 and into the diffuser cap portion 34 and thus allows this inflation gas to vent through the openings 46 into the air bag assembly.

C. OTHER

As will be appreciated, a wide range of responses intermediate between MODE 1 and MODE 2 operation are possible.

For example, if desired such an inflator apparatus can be designed whereby at least a portion of the oxidant from the combustion chamber 60 is passed to the gas storage chamber 14 while the fluid fuel is retained within the fluid fuel holder 61. As a result, the expelled contents from the storage chamber 14 and out of the inflator 10 include at least a portion of the stored gas and at least a portion of the oxidant passed thereinto from the combustion chamber 60.

Additionally, responses intermediate between MODE 1 and MODE 2 operation are possible wherein both the gas storage chamber opening device 45b and the combustion chamber initiator device 82 are actuated, with the time period between the actuation of each of these devices being appropriately selected.

Thus, under different circumstances, such as, for example, when the occupant is sensed to be out-of-position, the actuation of the gas storage chamber opening device 45b and the combustion chamber initiator device 82 can be sequenced and timed such that the inflator begins releasing the relatively cold, inert gas stored from the gas storage chamber 14 prior to release therefrom of combustion products resulting from the combustion of the at least one fluid fuel and the at least one oxidant within the combustion chamber 60.

FUEL MATERIALS

The fluid fuels useable in such an apparatus include a wide range of gases, vapors, finely divided solids and liquids such that, when used with one or more suitable oxidants in proper proportion(s) at selected conditions (either alone or in conjunction with one or more inert gases) form a flammable mixture.

Such fluid fuels include hydrogen, as well as hydrocarbon-based fuels such as hydrocarbon and hydrocarbon derivative fuels. For example, such hydrocarbon fuels include those constituting naphthenic, olefinic and paraffinic hydrocarbon groups, particularly $C_1$–$C_4$ paraffinic hydrocarbon fuels. Suitable fuels that can be used in the practice of the invention include, for example; gasoline, kerosene, and octane. In addition, hydrocarbon derivative fuels such as those constituting various alcohols, ethers, and esters, for example, particularly those containing four or fewer carbon atoms and, in particular, alcohols such as ethyl and propyl alcohol can advantageously be used in the practice of the invention.

In general, the finely divided solid fuels useable in the practice of the invention must be of sufficient energy content and reactivity to heat the volume of stored gas to inflate the inflatable restraint device at the desired rate, without the inflator device being of an undesirable large size. Additionally, the fuel desirably produces no more than acceptable levels of combustion products, such as CO, NO, HCN, or $NH_3$, for example, which are or become toxic at sufficiently high concentrations.

The finely divided solid fuel useable in the practice of the invention can include one or more various powders or dusts such as those of:

a) carbonaceous materials such as coal and coal products (e.g., anthracite, bituminous, sub-bituminous, etc., such as with various volatile contents), charcoal, oil shale dust, and coke;

b) cottons, woods, and peat (such as various cellulosic materials including, for example: cellulose acetate, methylcellulose, ethylcellulose, and cellulose nitrate, as well as wood and paper dusts);

c) food feeds (such as flours, starches and grain dusts);

d) plastics, rubbers, and resins (such as epoxies, polyesters and polyethylenes); and e) metal and metal alloy materials (e.g., aluminum, magnesium, titanium, etc., as powders, grits, and/or shavings, in pure or compound form).

It is to be understood that such fuel can, if desired, be held in combinations with varying contents of liquid, vapor and combinations thereof of water.

Further, it will be appreciated that the finely divided solid fuels useable in the practice of the invention will typically include solid particles of varying size and shape. In general, however, the particle size of such finely divided solid fuel will typically vary in a range between about 5 to 500 microns and preferably in a range of about 10 to 125 microns, with mean particle sizes in the range of 10 to 40 microns. In practice, such sized finely divided solid fuels can desirably result in rapid and complete combustion, reducing or even eliminating the need for filtration of particulate from the corresponding inflator assembly design.

The use of finely divided solid fuels can result in various processing advantages. For example, such solid fuels, at least as compared relative to gaseous or liquid fuels, can simplify handling requirements and facilitate storage within an appropriate fuel storage chamber. Such facilitation in handling can, in turn, result in manufacturing cost reductions.

It will be appreciated that the fuel material, particularly fuel materials such as liquid hydrocarbons and liquid hydrocarbon derivatives (e.g., alcohols) may include therewith, in limited proportions, materials such as water that are normally not considered to be fuels. This is particularly true for those fuel materials for which complete water separation is not normally practically realizable. Additionally, the presence of water in minor amounts, e.g., less than about 10 vol %, typically between about 4–8 vol %, can beneficially reduce the possibility of undesired autoignition of the inflator assembly without significantly affecting the low temperature performance of the assembly.

It is also to be appreciated that various fuel materials can, if desired, be used mixed together. This is particularly true for those fuel materials, such as commercial grade butane, for which complete separation is not normally practically realizable. For example, fuel mixtures which have been used include: a) an alcohol mix containing about 80% ethyl alcohol, 8–10% methyl alcohol, and 4–8% water, with the balance constituting other various hydrocarbon species and b) an alkane mix containing about 90+% (e.g., about 95%) butane, 2–6% (e.g., about 4%) propane and with the balance constituting methane, ethane and other various trace hydrocarbon species. An example of such a fuel material is the denatured ethanol, "ANHYDROL SOLVENT SPECIAL, PM-4061, 190 Proof", sold by Union Carbide Chemicals and Plastics Company Inc.

Further, such fuels can be used in multi-phase combinations of two or more of the fuels in different states (e.g., gas, liquid, and solid). For example, the fluid fuel used can constitute a combination or mixture of a finely divided solid fuel in a liquid fuel, such as a starch in ethyl alcohol, for example. Similarly, the fluid fuel can constitute a combination or mixture of a gaseous fuel held in intimate contact with a liquid fuel. For example, such a gaseous fuel could be held in contact with the liquid fuel under pressure, similar in fashion to a carbonated beverage held in a container.

Further, as operation of such a multiple level air bag inflator in accordance with the invention can result in discharge of a significant portion or more of the stored pressurized gas prior to combustion of the fluid fuel or release of the gas generated as a result of such combustion, fuel materials that can be quickly burned and consumed can be especially advantageous in the practice of the invention.

In view thereof, preferred fuel materials for use in the practice of the invention can be of gaseous and liquid form. Specifically, the use of fuel gases such as hydrogen, methane and ethane, particularly homogeneous forms thereof, can result in enhanced rapid and complete combustion. Further, as energy used to effect vaporization, dispersion and atomization of liquid materials can be considered as losses that must be compensated for through the use of larger, more expensive and bulkier initiators the use of liquid forms of fuel materials having relatively high energy densities, low heats of vaporization and/or low surface tensions and viscosities can be advantageous as such materials generally require less energy to effect vaporization, dispersion and atomization. Thus, liquid fuel materials such as alcohols of no more than four carbon atoms, including ethyl alcohol such as the denatured ethanol materials identified herein, and $C_1$–$C_4$ paraffinic hydrocarbons can be used. In particular, as a result of properties such as a relatively small heat of vaporization and large heat density, the use in the invention of a fuel material of butane (including normal butane, iso butane and mixtures thereof) can be particularly beneficial and desirable.

OXIDANTS AND OXIDANT MIXTURES

Oxidants useable in the invention include various oxygen-containing gases including, for example, pure oxygen, air, diluted air, and oxygen combined with one or more gas diluents such as nitrogen, carbon dioxide, and noble gases such as helium, argon, xenon. In practice, the use of pure oxygen ($O_2$) may be disadvantageous for a number of reasons including: 1) from a production viewpoint, such use may present handling difficulties, 2) such use can magnify autoignition difficulties, 3) when combined with the proper amounts of fuel (stoichiometric or near stoichiometric, $0.8 \leq \phi \geq 1.2$), extremely high flame temperatures can result (especially at the elevated pressures commonly associated with such inflator designs, and 4) at equivalence ratios of less than 0.8, excess quantities of oxygen and carbon monoxide can cause concern.

In view thereof, mixtures of argon and oxygen may be preferred. Argon advantageously is relatively: 1) inert, 2) inexpensive, 3) safe, and 4) easy to handle. The preferred relative amounts of the components of such a mixture will in general be dependent on factors such as the inflator geometry and the particular fuels used therein. For example, an oxidant mixture of 50–65 vol % oxygen with the balance being argon can advantageously be used with ethyl alcohol-based fuel-containing assemblies.

It will also be appreciated that such oxidant mixtures can be used in conjunction with minor amounts of air, such as may be initially present in the chamber to be filled with oxidant, prior to the addition of the oxidant therein.

Further, with respect to oxidants used in conjunction with a finely divided solid fuel, while the above-described oxidants are useable therewith, an enriched-oxygen mixture at elevated pressures is believed preferred.

It is to be understood that reference to a mixture as having "enriched-oxygen" is relative to a mixture having an oxygen concentration similar to that of air. Thus, mixtures containing greater than about 21% oxygen are herein considered to be "enriched-oxygen" mixtures.

In the practice of the invention, such enriched-oxygen oxidant mixtures will generally be of a pressure in the range of about 500 to about 3000 psia (about 3.45 to about 20.7 MPa), preferably in the range of about 1000 to about 2000 psia (about 6.9 to about 13.8 MPa). Further, as described above, the oxygen can be mixed with an inert gas. In addition, the use of an oxidant mixture containing about 35 to 65% oxygen, about 2 to 15% helium, and with the balance constituting one or more inert gas (such as helium, argon, and nitrogen), either alone or in various relative amounts can be advantageous. For example, an oxidant mixture of about 60% oxygen, about 32% argon and about 8% helium can result in improved hot, cold and/or ignition delay performance as well as facilitate, during the manufacturing process, the detection of leaks from the device.

Thus, the invention permits the use of a wide range of fuels in a variety of forms (including gaseous, liquid, and solid, as well as mixtures thereof, including multi-phase combinations of two or more fuel materials) and a wide variety of oxidant species, and also a wide range of relative amounts of fuel and oxidant species.

Figure 2:
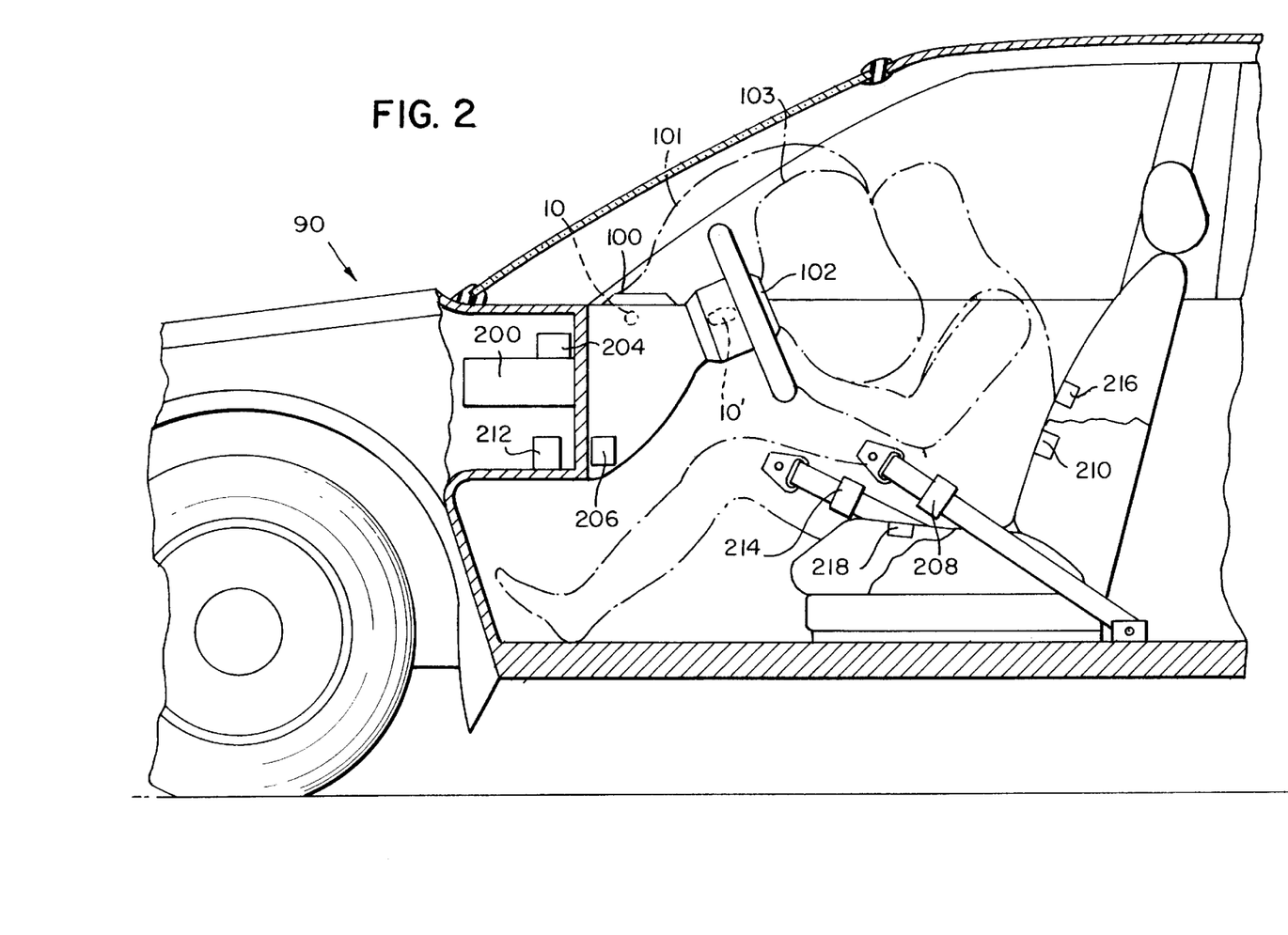
FIG. 2 is a simplified, partially in section, view of a vehicle including an air bag system incorporating the multiple level fluid fueled air bag inflator of FIG.1

Turning to FIG. 2, there is illustrated an air bag system 90 in conjunction with an automotive vehicle, similar to the air bag system disclosed in U.S. Pat. No. 5,411,289, issued May 2, 1995, by Smith et el. and the disclosure of which is incorporated herein by reference.

The air bag system 90 includes, on the passenger side, an air bag module 100 including an air bag 101 and the multiple level fluid fueled air bag inflator 10 and, on the driver side, an air bag module 102 including an air bag 103 and a corresponding multiple level fluid fueled air bag inflator 10' in accordance with the invention, for a driver side application.

An electronic control unit (ECU) 200 and a plurality of sensors 204, 206, 208, 210, 212, 214, 216 and 218 are illustrated within the vehicle.

French patent application No. 92 09829 by Hallard et al., filed Aug. 7, 1992 (corresponding to commonly assigned U.S. Pat. No. 5,346,249) discloses an air bag enclosure for a driver side air bag module as may be used with a multiple level fluid fueled air bag inflator, in accordance with the invention, for the air bag module 100. Commonly assigned U.S. Pat. No. 5,407,226 by Lauritzen et al. discloses an air bag module of the type that can be used for the passenger side air bag module 102. The subject matter of the above-identified, commonly assigned U.S. patents are herein incorporated by reference.

Figure 3:
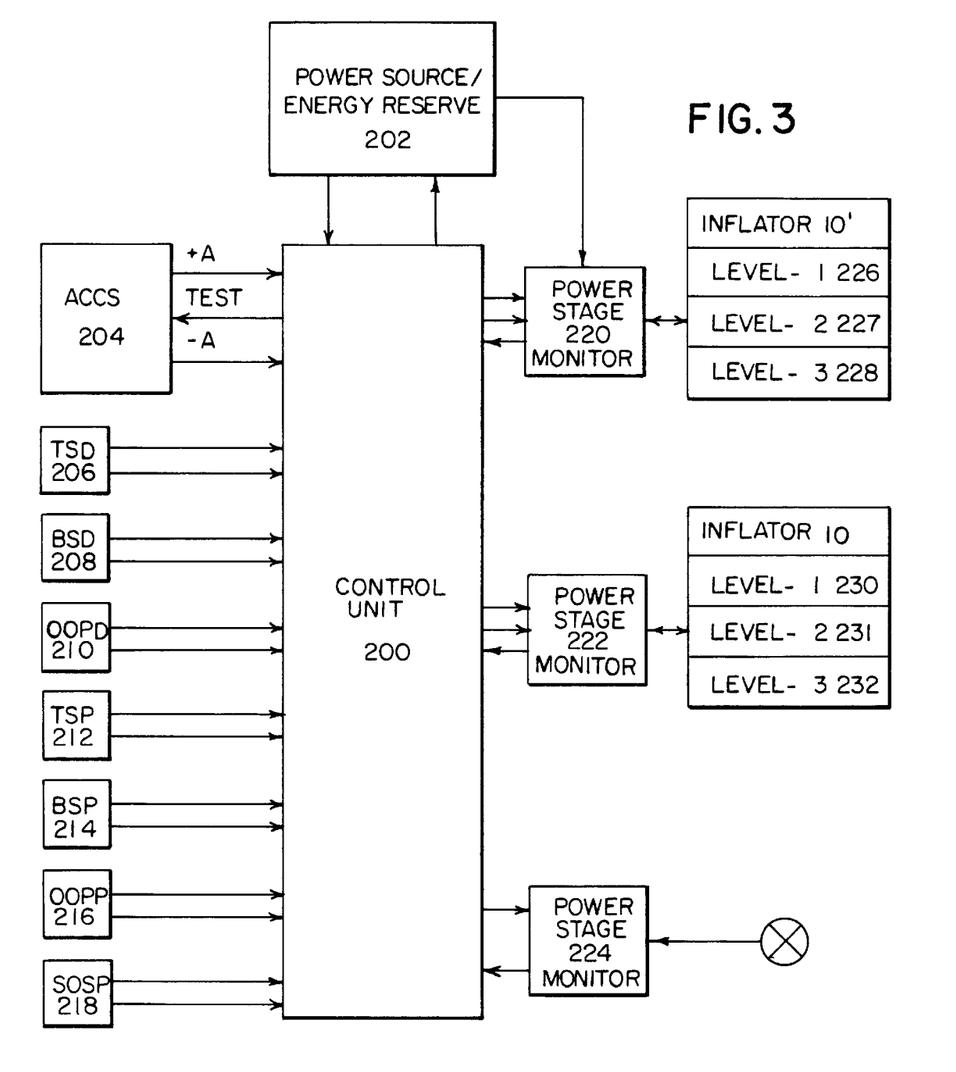
FIG. 3 is a block diagram representation of the air bag system of FIG. 2.

The sensors include an acceleration sensor (ACCS) 204; a temperature sensor driver (TSD) 206; a temperature sensor passenger (TSP) 212; a buckle switch driver (BSD) 208; a buckle switch passenger (BSP) 214; an out-of-position sensor driver (OOPD) 210; an out-of-position sensor passenger (OOPP) 216 and an optional seat occupancy sensor passenger (SOSP) 218. Thermocouples or negative temperature coefficient (NTC) resistors can be used for the temperature sensors 206 and 212. Belt lock contacts with parallel and serial resistors for analog evaluation and fault detection possibility can be used for buckle switch sensors 208 and 214. A microwave radar sensor or similar device can be used for the out of position sensors 210 and 216. Capacitive sensor measuring stray capacitance between back rest and seating elements can be used as capacitance-electrodes for the seat occupancy sensor passenger 218. If desired, if an OOPP 216 is used, the SOSP 218 can be eliminated.

Further, it will be appreciated that a capacitance-sensor system, similar to that described above, can be sued to sense occupant size and/or weight. Thus, an array of sensors placed in the occupant seat or in the passenger compartment can be used to measure parameters such as the distance between, and possible contact of, the seat backrest and selected seating elements so that the weight and size of an occupant can be appropriately estimated or considered. For example, the control unit can be used to analyze the sensed or detected amount or extent of deflection of known seating elements (such as selected seat surfaces, for example) in relation to one another in order to determine the size and weight of an occupant.

The ECU 200 can advantageously be mounted in the vehicle interior, to better avoid the relatively harsh outside environment. In practice, the ECU 200 can be located near the driver or alternatively in the rear of the vehicle and preferably symmetrically located. It is to be understood that the actual location of the ECU 200 or the acceleration sensor 204 will generally be based on the preferred signal location for a specific vehicle application. The ECU 200 can contain a dual accelerometer, piezoelectric or silicon micro-machined type (ACCS) 204 for measuring the deceleration during an impact.

A power source and energy reserve 202 coupled to the ECU 200 includes, for example, a 12 volt DC battery and a capacitor that is capable of supplying the unit with energy during a normal crash period, such as about 150 milliseconds. A plurality of power stages 220, 222 and 224 coupled to the ECU 200 are capable of supplying energy for actuating or firing commercially available pyrotechnic initiator devices such as used as the combustion chamber initiator device and the gas storage chamber opening device.

Thus, the signals from each of the sensors are processed by a micro-controller or the electronic control unit (ECU) 200 to affect desired inflation of the air bags 101 and 103 of each of the modules 100 and 102, respectively, e.g., for the driver side, one of the output levels 226, 227 and 228 and, for the passenger side, one of the output levels 230, 231 and 232. The control unit, based on the sensed inputs thereinto, selects the most appropriate gas generation level and combustion chamber initiator device and storage chamber opening device actuation times and sequencing to tailor the systems performance to the specifics of the particular crash incident.

Thus, upon receipt by a corresponding air bag module of a first level output from the sensor means, the expelled contents from the gas storage chamber 14 will consist essentially of at least a portion of the inert gas stored therein.

Upon receipt by a corresponding air bag module of a third level output from the sensor means the expelled contents from the stored gas chamber includes at least a portion the stored gas and at least a portion of the combustion products produced by burning the at least one fluid fuel and the at least one oxidant in the combustion chamber.

Also, it will be understood that a wide range of responses intermediate between these are possible upon receipt by a corresponding air bag module of an appropriate output from the sensor means. For example, upon receipt by a corresponding air bag module of a second level output from the sensor means (e.g., such second level output typically being intermediate between the above identified first and third level outputs), the expelled contents from the gas storage chamber initially consist essentially of at least a portion of the stored gas and, at a predetermined interval subsequent to the initial expulsion of contents therefrom consisting essentially of at least a portion of the stored gas, the expelled contents from the stored gas chamber include at least a portion of the contents of combustion chamber passed.

In one specific embodiment, the contents of the combustion chamber passed into the gas storage chamber is free of the fluid fuel, e.g., is primarily oxidant or oxidant mixture stored in the combustion chamber. For example, the fluid fuel is not released from the fuel holder and the inflator is operated without initiating the burning of the at least one fluid fuel and the at least one oxidant, i.e., without actuating the initiator device 82, In another specific embodiment, the actuation of the gas storage chamber opening device and the combustion chamber initiator device are sequenced and timed such that the inflator begins releasing the relatively cold, inert gas stored from the gas storage chamber prior to release therefrom of combustion products resulting from the combustion of the at least one fluid fuel and the at least one oxidant within the combustion chamber.

The present invention is described in further detail in connection with the following examples which illustrate/simulate various aspects involved in the practice of the invention. It is to be understood that all changes that come within the spirit of the invention are desired to be protected and thus the invention is not to be construed as limited by these examples.

EXAMPLES

In each of these examples, a heavyweight reusable passenger side sized test inflator (having a 30 cubic inch inert gas storage chamber) was fired into a rigid tank having a volume of 100 liters and the tank pressure as a function of time was monitored. The test inflator, however, was operated in a premixed fuel-oxidant mode with the fuel and oxidant stored as an intimate mixture in the combustion chamber.

In each example, the test inflator was filled as closely as possible with the following fuel, oxidant and inert gas loads:

The inert gas storage chamber was filled with 100% argon to a pressure of 4000 psia (27.6 MPa). A fuel load of 6.3 gm of denatured ethanol, "ANHYDROL SOLVENT SPECIAL, PM-4083, 200 Proof," sold by Union Carbide Chemicals and Plastics Company Inc. was placed in the combustion chamber which was then filled to a pressure of 1850 psia (12.8 MPa) with a mixture of 65% oxygen and 35% argon.

The test inflator utilized a pyrotechnic initiator as an initiator device situated in the wall of the combustion chamber. As described above, the hot gas produced upon the burning of the flammable fuel-oxidant mixture results in a rapid pressure rise within the combustion chamber. When the gas pressure within the combustion chamber exceeded the structural capability of the rupture disc separating the combustion chamber from the stored gas chamber, the disc ruptured or otherwise permitted the passage of the hot gas into the storage chamber. Wherein, the hot combustion gas expelled from the combustion chamber mixed with the pressurized stored gas producing inflation gas. When the gas pressure within the storage chamber exceeded the structural capability of the rupture disc sealing passage from the storage chamber 50 and out of the inflator, the disc ruptured or otherwise permitted the passage of the inflation gas out of the inflator.

The test inflator also included as the gas storage chamber opening device a second pyrotechnic initiator, similar to the above-described pyrotechnic initiator situated in the wall of the combustion chamber. This pyrotechnic gas storage chamber opening device was positioned so that the combustion products resulting upon the actuation thereof directly impinged against the rupture disc, which normally seals gas passage from the inert gas storage chamber through the diffuser assembly and out of the inflator. Thus, such impingement results in the failure of the disc and passage of gas therethrough and out of the inflator.

Example 1

The above-described test inflator was operated in the "standard mode" with only the combustion chamber initiator being actuated, i.e., the gas storage chamber opening device was not actuated.

Examples 2–6

The above-described inflator was operated with actuation of the gas storage chamber opening device followed, at a selected time interval, by actuation of the combustion chamber initiator device. In EXAMPLES 2–6, the actuation of the combustion chamber initiator followed the actuation of the gas storage chamber opening device by 5, 10, 15, 25 and 40 milliseconds, respectively.

Example 7

The above-described test inflator was operated without actuation of the combustion chamber initiator rather, only the gas storage chamber opening device was actuated.

DISCUSSION OF RESULTS

Figure 4:
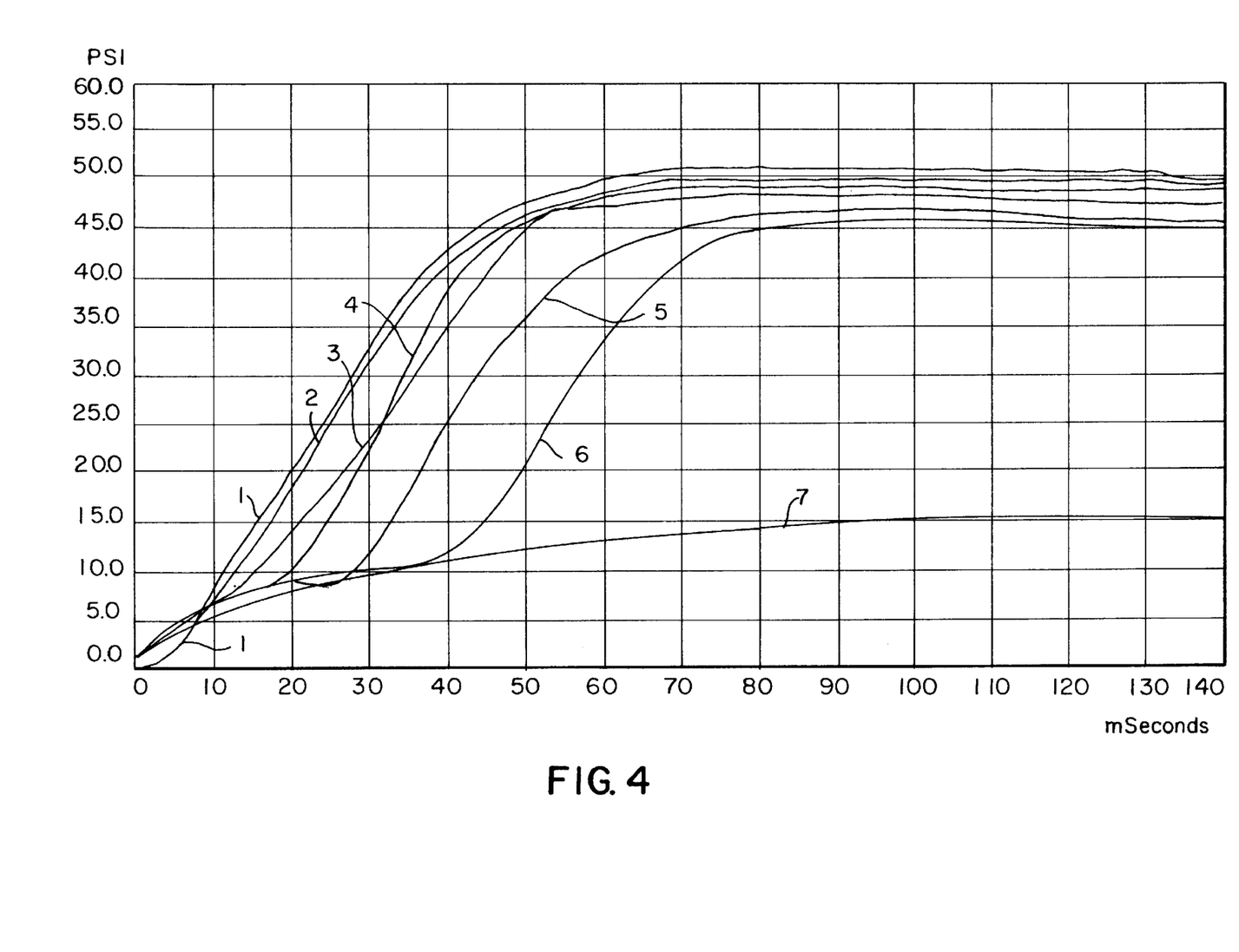
FIG. 4 shows the tank pressure as a function of time performance obtained in Examples 1–7 with a test multiple level fluid fueled air bag inflator illustrating aspects of the subject invention.

FIG. 4 presents the tank pressure as a function of time obtained in Examples 1–7.

Example 1 represents the standard mode of operation wherein the combustion chamber initiator is actuated and the gas storage chamber opening device was not actuated. As expected, the Example 1 curve of tank pressure as a function of time shows that the rate of pressure rise in the tank was initially relatively low, but accelerated very quickly to produce an aggressive pressure rise rate in the tank. Inflator performance and operation resulting in such a rapid rate of pressure rise is believed to be particularly suited in the instance of a high speed collision with a properly situated occupant.

The Example 2 curve of tank pressure as a function of time showed that some inflation gas was released from the test inflator earlier or more quickly than realized in Example 1, the curves, however, were quite similar.

The Example 3 and 4 curves of tank pressure as a function of time differed significantly from the Example 1 and 2 curves. Specifically, the Example 3 and particularly the Example 4 curve showed that through the early release of the stored gas (obtained through sequential actuation whereby the gas storage chamber opening device is actuated first followed, at a specified time interval, by actuation of the combustion chamber initiator device) a more gentle and gradual pressure rise rate was realized. Inflator performance and operation in such a manner would allow an air bag attached to such an inflator to deploy more gently and are believed to be particularly beneficial in instances where the occupant is sensed to be out of ideal position relative to the air bag at the time of the collision.

The slight irregularities between the Example 3 and 4 curves were attributed to experimental uncertainties, from example to example, in the filling of the test inflator.

The Example 5 and 6 curves of tank pressure as a function of time demonstrate that, for such a multiple level fluid fueled air bag inflator, the period of most rapid change in tank pressure versus time (i.e., the most aggressive portion of the pressure rise rate) can be tailored to occur when appropriately desired.

The Example 7 curve of tank pressure as a function of time showed that with release of only the relatively cold stored gas, the maximum pressure realized was significantly lower and the rapid pressure rise rates associated with combustion of the stored fuel were avoided. Inflator performance and operation in such a manner may be advantageous for protection of vehicle occupants under special circumstances. For example, an occupant, particularly a relatively small, light weight occupant seated forward in the seat near the vehicle instrument panel and without the seat belt fastened, may derive some beneficial protection as a result of such mode of operation.

Thus, these examples illustrate that a fundamental aspect of the invention, e.g., sequential release of gases from such a multiple level fluid fueled air bag inflator, varies the pressure rise characteristics resulting therefrom and in turn the pressure rise characteristics realized by an air bag attached therewith. Further, such a multiple level fluid fueled air bag inflator in combination with an appropriate sensor system can be used to adjust the inflation performance characteristics of a corresponding air bag based on parameters such as the ambient temperature, occupant presence (including occupant size, weight, and/or position), seat belt usage and deceleration of the motor vehicle (e.g., severity of the collision).

Additionally, while the practice of the invention in its broader aspects is not limited to such multiple level inflators made of a particular material of construction, in practice, due to consideration such as pressure capability and cost, such inflators would likely be constructed of metal, such as steel or aluminum, for example.

Thus, in accordance with the invention, there has been provided an air bag system which, from a single source and dependent on appropriately selected operating conditions, can effectively and efficiently produce air bag inflation gas at a rate and/or pressure selected from a wide range of possible responses. Further, there is provided a multiple level air bag inflator which effectively and efficiently decouples the rate of the gas generating combustion reaction from the rate of supply of stored or generated gas therefrom.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. In an air bag system for a motor vehicle, the system comprising at least one air bag module containing at least one inflatable air bag and sensor means for sensing at least one air bag system operating condition selected from the group of ambient temperature, occupant presence, seat belt usage and deceleration of the motor vehicle, the improvement comprising:

a multiple level air bag inflator coupled to the at least one air bag module, said multiple level air bag inflator adapted to produce and release, to the air bag, inflation gas at multiple inflation levels, said multiple level air bag inflator containing at least one fluid fuel and at least one oxidant and comprising:

a first chamber containing a supply of pressurized stored gas, said first chamber including at least one gas exit port and having sealing means normally closing the at least one gas exit port;

opening means to open the at least one gas exit port whereby at least a portion of the contents of said first chamber are expelled from said first chamber;

directing means for directing the expelled contents of said first chamber to the air bag;

a second chamber containing the at least one fluid fuel stored separately from the at least one oxidant wherein, upon actuation, the at least one fluid fuel and the at least one oxidant are contacted and burned to produce combustion products including hot combustion gas, said second chamber including at least one gas exit opening and having sealing means normally closing the at least one gas exit opening, the second chamber sealing means having a first surface adjacent said first chamber and a second surface adjacent said second chamber such that upon opening of the second chamber sealing means said second chamber is in fluid communication with said first chamber, the second chamber sealing means adapted to open when the difference in pressure at the first and the second surfaces becomes sufficiently large, whereby at least a portion of the contents of said second chamber are passed into said first chamber; and initiator means for initiating the burning of the at least one fluid fuel and the at least one oxidant in said second chamber;

wherein, upon receipt by the module of a first level output from the sensor means, the gas released from said multiple level air bag inflator is free of combustion products and wherein, upon receipt by the module of a third level output from the sensor means, the gas released from said multiple level air bag inflator comprises at least a portion of the stored gas and at least a portion of the combustion products produced by burning the at least one fluid fuel and the at least one oxidant in said second chamber.

2. The improvement of claim 1 wherein the fluid fuel of the multiple level air bag inflator comprises a gaseous form.

3. The improvement of claim 1 wherein the fluid fuel of the multiple level air bag inflator comprises a liquid form.

4. The improvement of claim 1 wherein the fluid fuel of the multiple level air bag inflator comprises a $C_1$–$C_4$ paraffinic hydrocarbon.

5. The improvement of claim 4 wherein the fluid fuel of the multiple level air bag inflator comprises butane.

6. The improvement of claim 1 wherein the fluid fuel of the multiple level air bag inflator comprises an alcohol of no more than four carbon atoms.

7. The improvement of claim 6 wherein the fluid fuel of the multiple level air bag inflator comprises ethyl alcohol.

8. A method of operation of a multiple level air bag inflator in an air bag system for a motor vehicle, the system comprising at least one air bag module containing at least one inflatable air bag and sensor means for sensing at least one air bag operating condition selected from the group of ambient temperature, occupant presence, seat belt usage and deceleration of the motor vehicle, the air bag inflator containing at least one fluid fuel and at least one oxidant and having:

a) a first chamber containing a supply of pressurized stored gas, the first chamber including at least one gas exit port and having sealing means normally closing the at least one gas exit port;

b) opening means to open the at least one gas exit port whereby at least a portion of the contents of the first chamber are expelled from the first chamber;

c) directing means for directing the expelled contents of the first chamber to the inflatable air bag;

d) a second chamber containing a supply of the at least one fluid fuel stored separately from the at least one oxidant and wherein, upon actuation, the at least one fluid fuel and the at least one oxidant are contacted and burned to produce combustion products including hot combustion gas, the second chamber including at least one gas exit opening and having sealing means normally closing the gas exit opening, the second chamber sealing means having a first surface adjacent the first chamber and a second surface adjacent the second chamber such that upon opening of the second chamber sealing means the second chamber is in fluid communication with the first chamber, the second chamber sealing means adapted to open when the difference in pressure at the first and the second surfaces becomes sufficiently large, whereby at least a portion of the contents of the second chamber are passed into the first chamber; and e) initiator means for initiating the burning of the at least one fluid fuel and the at least one oxidant in the second chamber;

wherein:

1) in response to receipt by the module of a first level output from the sensor means, said method comprises the steps of:

opening the at least one gas exit port, and releasing, to the inflatable air bag, inflation gas free of combustion products; and 2) in response to receipt by the module of a third level output from the sensor means, said method comprises the steps of:

initiating and burning the at least one fluid fuel and the at least one oxidant in the second chamber, opening the at least one gas exit port and the second chamber sealing means, and releasing, to the inflatable airbag, inflation gas comprising at least a portion the stored gas and at least a portion of the combustion products produced by burning the at least one fluid fuel and the at least one oxidant in the second chamber.

9. The method of claim 8 wherein the fluid fuel of the multiple level air bag inflator comprises a gaseous form.

10. The method of claim 8 wherein the fluid fuel of the multiple level air bag inflator comprises a liquid form.

11. The method of claim 8 wherein the fluid fuel of the multiple level air bag inflator comprises a $C_1$–$C_4$ paraffinic hydrocarbon.

12. The method of claim 11 wherein the fluid fuel of the multiple level air bag inflator comprises butane.

13. The method of claim 8 wherein the fluid fuel of the multiple level air bag inflator comprises an alcohol of no more than four carbon atoms.

14. The method of claim 13 wherein the fluid fuel of the multiple level air bag inflator comprises ethyl alcohol.

* * * * *